Jan. 16, 1962     W. BINDER     3,017,139
RING AIRFOIL AIRCRAFT
Filed Feb. 2, 1959     6 Sheets-Sheet 1
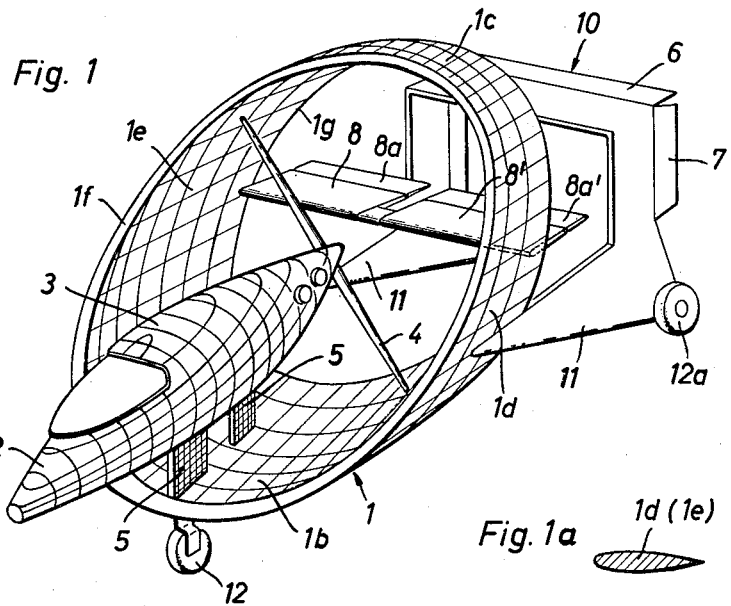
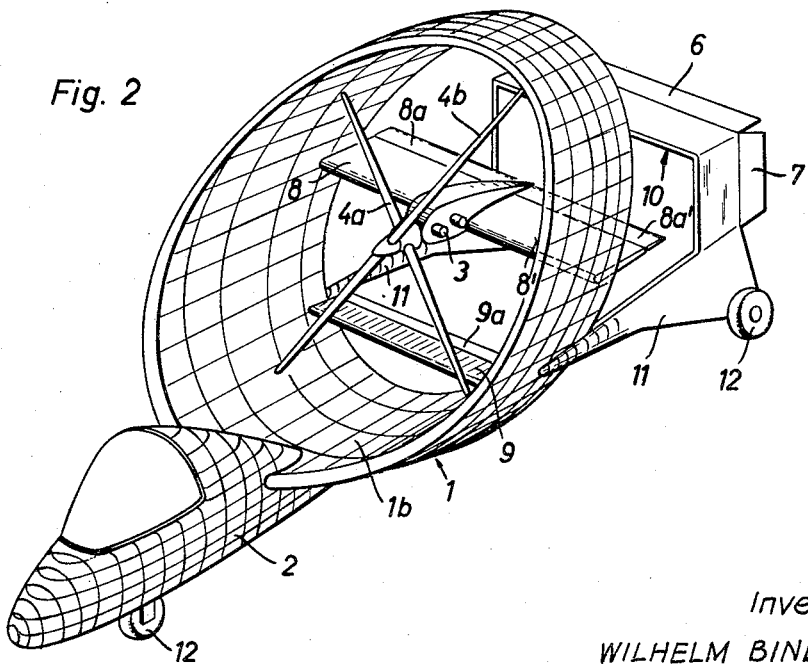
Inventor
WILHELM BINDER
By Toulmin & Toulmin
Attorneys Jan. 16, 1962 W. BINDER 3,017,139
RING AIRFOIL AIRCRAFT
Filed Feb. 2, 1959 6 Sheets-Sheet 3

Inventor,
WILHELM BINDER
By Toulmin & Toulmin
Attorneys

Jan. 16, 1962 W. BINDER 3,017,139
RING AIRFOIL AIRCRAFT
Filed Feb. 2, 1959 6 Sheets-Sheet 4

Inventor
WILHELM BINDER
By Toulmin & Toulmin
Attorneys

Jan. 16, 1962   W. BINDER   3,017,139
RING AIRFOIL AIRCRAFT
Filed Feb. 2, 1959   6 Sheets-Sheet 5

Inventor
WILHELM BINDER
By Toulmin & Toulmin
Attorneys

United States Patent Office
3,017,139
Patented Jan. 16, 1962

3,017,139
RING AIRFOIL AIRCRAFT
Wilhelm Binder, 9 Benediktinerring, Villingen,
Black Forest, Germany
Filed Feb. 2, 1959, Ser. No. 790,481
11 Claims. (Cl. 244—12)

This invention relates to airplanes having one or several annular wings referred to hereafter as ring airfoils, and to airplanes equipped with a combination of one or several of such ring airfoils and one or several of conventional wings, of substantially planar extension and of conventional airfoil cross section, and comprising in combination with such ring airfoils a propulsion system installed in the wing airfoil. The propulsion system may comprise one or several engine-driven propeller or jet-propulsion means destined for accelerating the air flowing through the ring airfoil.

In the known types of airplanes having a ring airfoil as the airplane wing, the ring airfoil is constructed as a body substantially presenting rotation symmetry, the airfoil thus being substantially cylindrical. It is an essential drawback of these known airplanes that during starting or landing operations the ring airfoil must assume a position in which the axis of revolution of the ring airfoil is more or less approaching the vertical, whereas during rapid flight of the airplane the airfoil takes a position in which the axis of revolution extends approximately in a general horizontal plane. It is understood that by "horizontal plane" there is meant a plane perpendicular to the corresponding radius of the earth extending through the flying aircraft.

It is, therefore, an object of my invention to provide an aircraft equipped partially or exclusively with one or several ring airfoils having a propulsion unit installed in at least one of the wing airfoils, the aircraft being capable of preserving substantially the same position of the ring airfoil axis of revolution during starting and landing operations as is assumed by that axis during rapid flight, the aircraft thus behaving similar to conventional planar wing airplanes during the first mentioned operations.

It is another object of my invention, to provide an airplane of the kind described in the preceding object and capable of preserving the aforesaid position during a very wide range of from rapid to slow flight and preferably down to a flight velocity of zero, i.e. when the plane hovers with almost no forward movement or "floats" in the air.

It is still another object of my invention to provide an aircraft which permits to maintain floating flight with a minimum of propulsive power acting in the aircraft.

These objects are obtained by a ring airfoil airplane equipped with a ring airfoil having installed therein a propulsion unit which differs from the known rotation-symmetrical drum shape by having its lower or bottom portion protruding in forward direction relative to the upper ring portion while the upper ring portion is disposed more toward the rear of the airplane.

According to an important feature of the invention, the ring airfoil comprises a central annular section or zone of preferably circular cross-sectional area and, consequently, cylindrical shape, in which central annular zone there is provided the propulsion means such as a propeller or propellers and the forward and rearward circumferential edges of this ring airfoil are provided in planes which form oblique angles with the horizontal longitudinal plane in which the axis of revolution of the ring airfoil extends. Preferably, the plane containing the forward or leading circumferential edge is less steeply shaped than the plane containing the rearward or trailing circumferential edge of the ring airfoil, so that the lower portion of the ring airfoil has a depth of profile which is larger than that of the upper portion.

The forwardly protruding lower portion of the ring airfoil may be trough-shaped. This portion of the ring airfoil may also be semi-cylindrical or cup-shaped, or the ring airfoil may merge in forward direction into a trough-shaped part of a conventional airplane wing, or into a conventional planar wing or a part of a planar wing. By "plane wing" there is to be understood a conventional wing having substantially flat upper and bottom faces and being of generally airfoil cross section. The upper surface of this forwardly protruding bottom portion of the ring airfoil or the part of the wing extending forwardly of this bottom portion of the ring airfoil is shaped in such a manner that even at a relatively steep angle between the direction of movement of the airplane and the general horizontal plane, i.e. a relatively steep angle of incidence, as is the case during slow or floating flight, the current of air inflowing into the ring airfoil causes a negative pressure and thus a lift effect at the suction or upper side of this portion without break away of flow while, at the same time the air flow past the leading edge of the airfoil-profiled front portion provides a further, additional lift effect.

In order to enhance the effectiveness of bearing portions of the ring airfoil, I prefer to provide special asymmetrical lift profiles (cross-sectional areas) within the range where lifting forces are generated at the ring airfoil, which asymmetrical profiles merge into symmetrical profiles within the range of the lateral portions of the ring.

The lower ring portion may also be used to house the aircraft cabin or at least parts thereof.

On the other hand, the aircraft cabin may also be located at the level of the central axis of the ring air-foil and may be supported on the forwardly protruding lower portion of the ring by struts or similar mounting means.

Furthermore, additional wing surfaces of conventional, substantially planar shape may also be provided in combination with the aforesaid main features of the invention, which wings may be arranged laterally relative to the ring airfoil itself and in particular of the forwardly protruding portion of the latter, depending upon a reasonable distribution of weight and eventually depending upon the location of the aircraft cabin in the airplane.

The size and location of these additional auxiliary wing surfaces depends largely upon the requirements due to the layout of the respective type of aircraft. However, lift-generating surfaces should always be provided in front of the propulsion means, for instance, the propeller housed in the tunnel formed by the ring airfoil according to the invention.

It is of advantage to arrange the control elements required for steering the airplane such as the rudder and the elevator and eventually also the necessary ailerons within the effective range of the air current emerging from the propulsion means housed in the ring airfoil tunnel.

In order to carry out slow or floating flights with this rigid-wing airplane according to my invention, the latter should be preferably so controlled that the major portion of the air jet generated, for instance, by the propeller of the airplane, is deflected downwardly by one or several flaps arranged, for instance, in a shutter-like group disposed downstream behind the propeller at the end of the tunnel, thereby converting the propelling force of this air jet into a lifting force. A smaller, preferably upper portion of the air jet should not be deflected but should be directed unobstructedly toward the control elements of the airplane comprising elevator and rudder means.

In order to control tilting or trimming of the airplane about its central longitudinal axis, one or several deflecting flaps provided in the air current as just mentioned, may be so devised as to work as ailerons, by dividing them along the central vertical plane and providing the necessary control devices for actuating these flaps as differential ailerons.

According to another feature of the invention, especially in jet-propelled aircraft provided with a ring airfoil according to the invention, air directing and deflecting means may also be provided at the entrance of the air current into the ring airfoil, which may equally be adapted for adjustment by the pilot.

The arrangement and shape of all supporting wing portions of the airplane as well as the location of its center of gravity and of the elevator means should be so chosen that a determined equilibrium of forces acting on the airplane is established as nearly as possible, be it during normal or rapid forward flight, or when the deflecting means are positioned and the elevator raised.

As will be seen from the detailed explanation of my invention given hereinafter, this new type of airplane behaves and is controlled during normal horizontal flight as any other standard rigid-wing airplane; the airplane is then propelled by its propulsion means and is lifted by the aerodynamic forces acting on its rigid supporting or wing surfaces, thereby permitting to attain a high traveling speed.

If the airplane according to the invention is to fly slowly or to float, the elevator is raised to a steep upward angle, while maintaining full engine power and retain the ailerons or other deflecting means in normal flight position. Part of the propelling force will then act upon the airplane as a lifting component. If, now, the ailerons or the like deflecting means are depressed, so that the major portion of the air jet generated by the propulsion means, be it a propeller or a jet propulsion engine, is deflected, preferably in perpendicular direction downwardly out of the ring airfoil of the plane, then the major portion of the propelling force produced by the engine will be converted into lift. Only a smaller portion of the air jet is still directed toward the elevator and rudder, in the same manner as during normal flight.

Additional lifting forces are generated due to the larger angle of incidence of the airplane, at the forwardly protruding portion of the ring airfoil.

The propelling forces of the airplane are thus converted into lifting forces during floating flight of the airplane, without requiring an undue change of the position of the airplane in space relative to the horizontal plane, and without losing control of the airplane about its three axes in space.

In the case of engine failure, the airplane according to my invention can pass easily from slow or floating flight to gliding, and the airplane can carry out a smooth emergency landing, if necessary without engine power.

Single or multi-passenger airplanes may be constructed in accordance with my invention. Larger passenger aircraft may be equipped with several ring airfoils containing propulsion means and being arranged in parallel.

The invention will be still better understood from the further description thereof in connection with the accompanying drawings in which FIGURE 1 is a perspective schematical view of a simplest embodiment of a ring airfoil-equipped aircraft according to the invention; FIGURE 1a is a cross-sectional view of a lateral wall of the ring airfoil shown in FIGURE 1;

FIGURE 2 is a schematical perspective view of another embodiment of a ring airfoil-equipped aircraft according to the invention being similar to that shown in FIGURE 1 but having a different arrangement of the propulsion means and passenger cabin;

Figure 3:
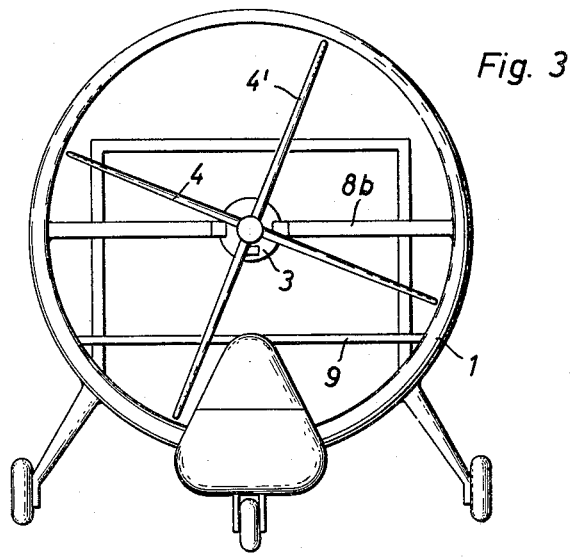
FIGURE 3 is a front view of the embodiment of the ring airfoil airplane shown in FIGURE 2.

The embodiments illustrated in FIGURES 1 to 8 show aircraft equipped exclusively with a ring airfoil as the supporting means. The other embodiments concern airplanes equipped with a combination of ring airfoil and "planar" wings. In both kinds of embodiments, the suction effect produced by the propulsion means serves for generating lift during slow flight.

In the embodiment in FIGURE 1, reference numeral 1 designates the ring airfoil and 2 the passenger cabin body which is mounted approximately at the level of the axis of the geometrical cylinder enclosed by ring airfoil 1. Propulsion means 3 of the engine driven propeller type are housed in the rear part of cabin body 2 and comprise the propeller 4 which rotates in that part of the aforesaid geometrical cylinder which is actually completely enclosed by the central portion 1a (FIGURE 6) of ring airfoil 1 thus constituting a tunnel. Due to this arrangement, the known increase in efficiency caused by the provision of a propeller in a ring airfoil can be fully exploited also in the arrangement according to the invention. The completely enclosed tunnel portion of the ring airfoil is indicated by phantom lines in FIGURE 6.

At least in its protruding lower portion 1b and in its upper rearwardly extended portion 1c, the cross section of ring airfoil 1 is an airfoil, i.e. an asymmetrical profile. The lateral portions 1d and 1e of ring airfoil 1 are preferably of symmetrical profile, as shown in cross section in FIGURE 1a, and have the function of stabilizing surfaces for moments about the main vertical axis of ring airfoil 1.

The front or leading edge 1f and the rear or trailing edge 1g of ring airfoil 1 are elliptic and extend in planes forming oblique angles with a horizontal plane containing the longitudinal central axis of ring airfoil 1. Cabin 2 and propulsion means 3 are mounted by means of struts 5 on the protruding lower portion 1b of ring airfoil 1. The control device 10 which comprises conventional elevator means 6 and rudder means 7 is mounted at the tail end of the airplane and attached to ring airfoil 1 by means of connecting members 11. When on the ground, the airplane is supported on a front wheel 12 and two rear wheels 12a, only the portside one of which is visible in FIGURE 1. Of course, the front wheel 12 may be retractable into the bottom portion of ring airfoil 1, and the rear wheels 12a into connecting members 11, on which they are mounted.

The embodiment shown in FIGURE 1 also comprises as air-current deflecting means two stabilizers 8 and 8', each of which is of airfoil-shaped cross section and mounted rigidly to a spar in the interior of the ring airfoil 1. Along the trailing edges of stabilizers 8 and 8', there are provided hingedly connected aileron flaps 8a and 8a', respectively, which are interconnected in a conventional manner by a conventional differential gear (not shown). Thus, they can be lowered in unison, and/or operated like ailerons. Thereby it is possible to use them either for trimming or tilting the air, or for deflecting the air jet from the propulsion means in downward direction, by lowering both simultaneously.

In order to attain the above-mentioned object of ensuring very slow or floating (near-hovering) flight even at a minimum of propulsive force acting on the plane, it is necessary that the propeller acts upon the largest possible air volume and forces that volume to move in downward direction to maintain the airplane floating in the air; this lift effect is brought about with the aid of the aforesaid aileron-type deflecting means 8 and 8' and flaps 8a and 8a'.

The obliquely edged ring airfoil 1 provided with the enlarged lift-generating bottom portion 1b, can be made easily of such diameter that it closely fits the diameter of the circle described by the propeller 4, and that it merges into the desired trough shape of the lower portion of the wing surface.

It is thus easily possible to arrange several deflecting flaps at different levels transversely in the interior of ring airfoil 1. This is, for instance, the case in the embodiment shown in FIGURES 2 and 3. In these and in the following figures, like parts are designated by the same reference numerals as in FIGURE 1. In the embodiment shown in FIGURES 2 and 3 cabin 2 is placed in the trough formed by the protruding lower portion 1b of ring airfoil 1.

However, the propulsion means which include the motor and two air screws 4 and 4' rotating in opposite direction, are again located about the central longitudinal axis of ring airfoil 1 in the same manner as in the embodiment shown in FIGURE 1 and supported by at least one beam being rigidly connected to a spar in the interior of the airfoil and clad on each side of the motor in an airfoil hull which presents one of the below mentioned upper deflecting means 8 or 8a, respectively. Elevator means 6 are disposed as far as possible toward the tail end of the airplane in order to achieve a high degree of efficiency thereof. In this embodiment, the air jet from the propeller is deflected downwardly, during floating (or near-hovering) flight with the aid of upper deflecting means 8, 8a and flaps 8', 8a' similar to those used in the preceding embodiment, and a lower deflecting member 9 rigidly attached to walls 1d and 1e of ring airfoil 1, and adjustable deflecting flap 9a hingedly connected to member 9.

Deflecting means 8 and 8a are mounted about a cross bar or the like on which bar the propulsion means are also mounted. Flaps 8' and 8a' are operable in the same manner and for the same purpose as in the embodiment shown in FIGURE 1.

The upper portion of ring airfoil 1 in the embodiment of FIGURE 2 is so devised that the air current from the propulsion means can reach control means 10 comprising elevator means 6 and rudder means 7 unobstructedly.

Figure 4:
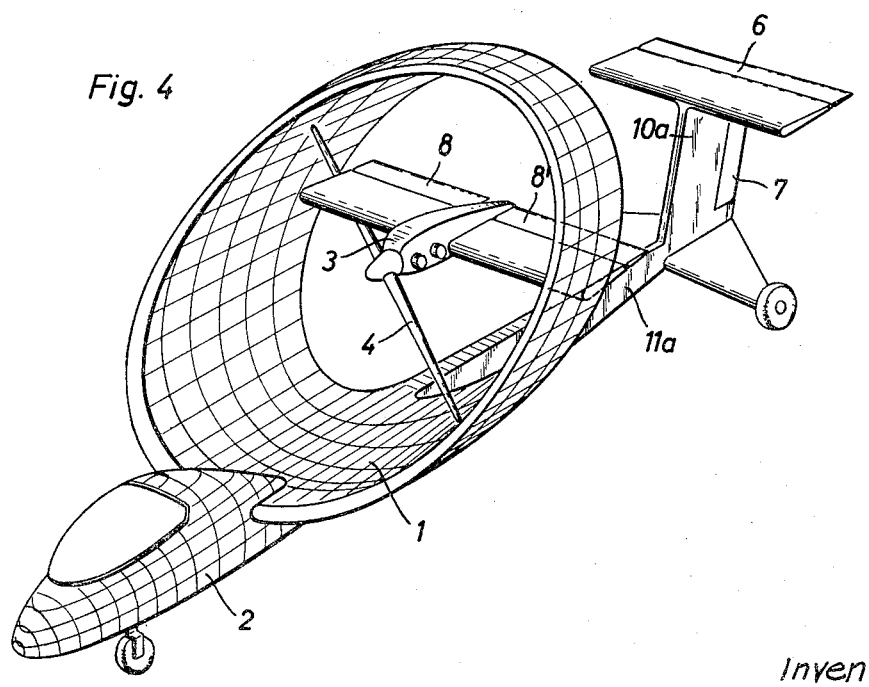
FIGURE 4 illustrates an embodiment of a ring airfoil airplane according to the invention similar to that shown in FIGURES 2 and 3 but having somewhat different control means and a differently devised tail end of the fuselage.

Yet another embodiment of an aircraft according to the invention is shown in FIGURE 4, which embodiment differs from the preceding ones by comprising only a single pair of individually adjustable deflecting means 8, 8', 8a, 8a' at the same level relative to ring airfoil 1 as in the embodiment of FIGURE 1, while the control devices 10a comprising elevator means 6 and rudder means 7 are mounted at the tail of a rearwardly extending supporting portion 11a of the fuselage the forward part of which comprises cabin 2 and is attached at the bottom portion 1b of ring airfoil 1, merging with the latter.

Figure 5:
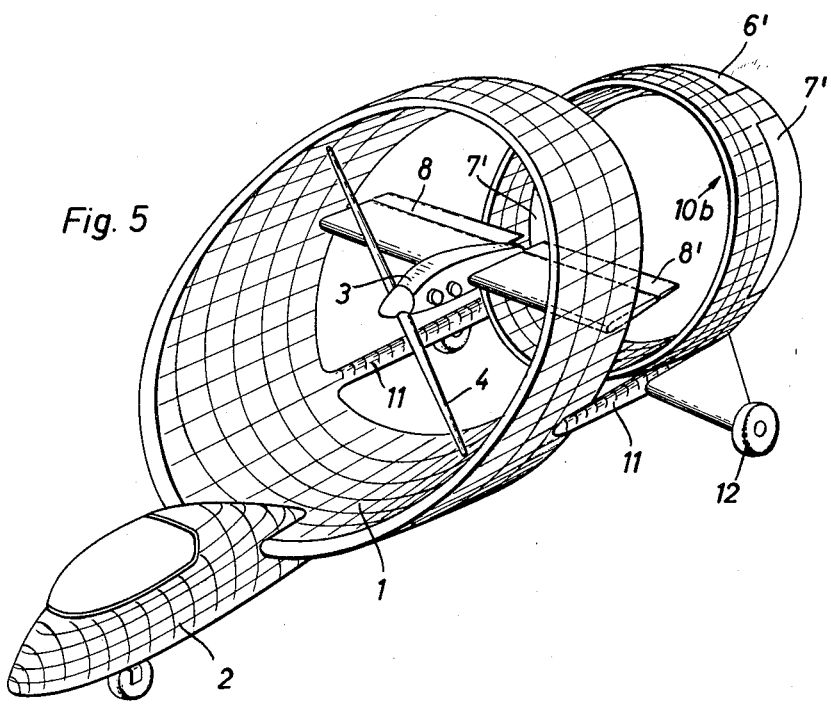
FIGURE 5 shows yet another embodiment similar to that shown in FIGURE 4 but with ring airfoil control means and a correspondingly modified tail end of the fuselage.

The next following embodiment of the airplane according to the invention shown in FIGURE 5 resembles the embodiment of FIGURE 2; however, control means 10b are of generally annular shape, and elevator 6' as well as rudder 7' are fitted into the circumferential portion of control means 10b, forming part of the trailing portions of the latter.

The aerodynamic function exercised by the ring airfoil of the airplane according to the invention will now be explained in more detail with the aid of an embodiment of the airplane shown in FIGURES 6 and 7.

This embodiment is similar to that shown in FIGURE 2, except that the propulsion device 3' is suspended from the stabilizers or stationary deflecting means 8, 8a attached to walls 1d and 1e of ring airfoil 1 (FIGURE 7) in contrast to the arrangement of these parts illustrated in FIGURE 3.

Figure 6:
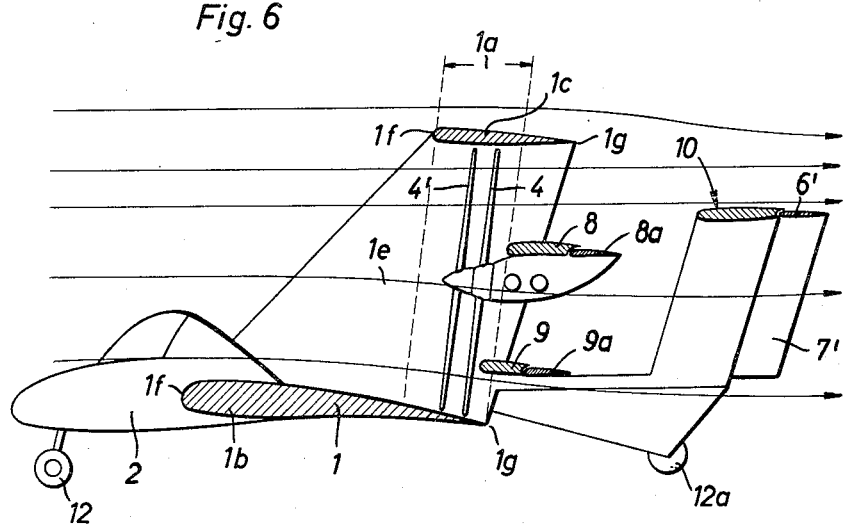
FIGURE 6 shows a lateral schematical and partly sectional view of an embodiment of the ring airfoil airplane according to the invention which is somewhat similar to the embodiment shown in FIGURES 2 and 3; this FIGURE 6 also shows the lines of airflow during horizontal flight of the airplane.

Being a lateral, partially sectional view, FIGURE 6 illustrates particularly well the rearwardly and obliquely displaced shape of ring airfoil 1; compared with the conventional substantially cylindrical ring airfoil, it imparts a particularly high stability to the airplane during rapid as well as during slow flight.

A continuous smooth transition from rapid to extremely slow flight can be effected.

Due to their positioning well downstream, in the flow of air through the airplane, elevator means 6 and rudder means 7 show satisfactory performance at all speeds. Flaps 8a, 8a' and 9 and 9a are used during the horizontal flight shown in FIGURE 6 for generating buoyancy and for trimming the airplane.

Figure 7:
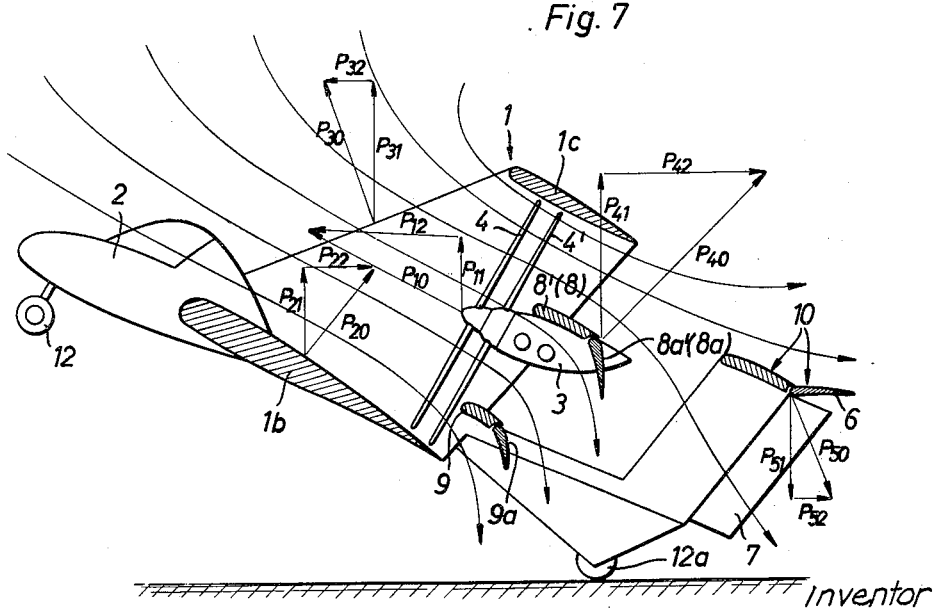
FIGURE 7 shows the airplane of FIGURE 6 during a landing operation, in which the airplane floats above the ground touching the latter only with its rear wheels; this figure also shows the lines of air flow and the aerodynamic forces acting on the ring airfoil and on the control means which forces are indicated by force vectors.

While the air current lines indicated in FIGURE 6 illustrate the aerodynamic functioning of the airplane during horizontal flight, such functioning during floating flight, at the instant when the airplane touches ground, is illustrated in FIGURE 7.

During the illustrated manoeuver, the engine of propulsion means 3 is preferably caused to run with full power, elevator means 6 are raised to maximal upturned position, while flaps 8a, 8a' and 9a depressed to their maximal' downward angle. Thereby, the entire airplane is given the rearwardly and downwardly inclined position shown in FIGURE 7, in which the plane touches ground only with rear wheels 12a.

During this operation, the propelling force P10 of air screws 4, 4' provides the airplane with a buoyancy component P11 and a horizontally forwardly directed component P12. The velocity of the air flowing past the lower forward ring airfoil edge into the mold or trough formed by the advanced bottom portion 1b of the ring airfoil, creates a buoyancy component P20 at the upper surface of portion 1b of ring airfoil 1, thereby imparting a vertically upwardly directed lifting force P21 and a rearwardly directed force component P22 to the airplane. The air screws which operate under full power, suck air into the ring airfoil 1 as indicated by the convergence of the lines of air flow in FIGURE 7 toward the entrance of the cylindrical ring air foil portion in front of propeller 2. Thereby at the nose of the ring airfoil, aerodynamic forces P30 are generated, which forces P30 impart to this part of the airplane a lifting component P31 and a horizontally forwardly propelling component P32.

The deflection of the lower half of the air jet rearward of propeller 4' due to the downwardly inclined flaps 8a, 8a', and 9a yields an aerodynamic buoyance P40 which imparts to that part of the airplane a lifting component P41 and a horizontally rearwardly directed braking component P42; triangle of forces P40, P41, P42 is to be considered the sum over the forces occurring at flaps 8a, 8a' and 9a.

The fully raised elevator means 6 receive a force P50 from the air current emerging mainly from the upper half of the tunnel formed by ring airfoil 1, which force P50 is composed of a vertically downwardly acting force P51 and a horizontally rearwardly acting component 52.

The outlay of the air plane is such that the sum of all aerodynamic force components is sufficient to balance the weight of the airplane itself during substantially floating flight and to guarantee safe control of the airplane tridimensionally in space. It should be noted that, during this type of flight, the horizontally disposed force components practically balance each other, and the airplane is not subjected to any appreciable forward component of removement, so that an almost hovering flight results.

In the event of engine failure, during very slow or floating flight, the elevator means fail to provide the last-mentioned force components, whereby the nose of the airplane tips gradually downwardly and the airplane passes to downward gliding flight.

Figure 8:
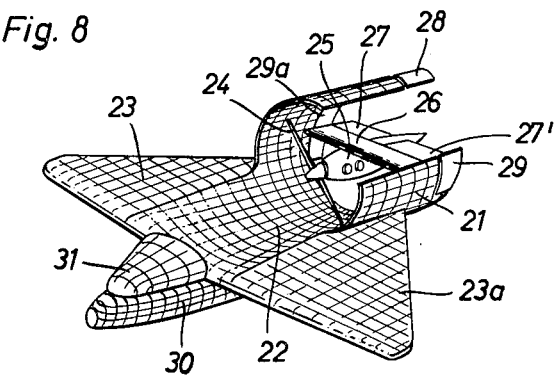
FIGURE 8 illustrates an embodiment of an airplane provided with a combination of conventional "planar" wings and a ring airfoil according to the invention, the ring airfoil being partly cut away.

In FIGURE 8 there is illustrated an airplane provided with a ring airfoil 21 according to the invention the forwardly extending lower portion of which merges into two conventional substantially planar lateral wings 23 and 23a.

The propelling means 25 driving air screw 24 are mounted in the interior of the cylindrical portion of ring airfoil 21 substantially in the same manner as described in connection with FIGURES 2 and 3, by suspension from a beam in the interior of deflecting means 26, 26'. The latter are also provided with flaps 27, 27' similar to flaps 8a and 8a' in the preceding embodiments.

Elevator 28 is provided as a continuation of the trailing edge of the upper portion of ring airfoil 21, while rudder means 29, 29a are provided laterally as a continuation of both sides of ring airfoil 21 and symmetrically to the perpendicular plane containing the longitudinal central axis of ring airfoil 21.

The fuselage 30 bearing in its front portion the pilot or passenger cabin 31 emerges toward the rear into the protruding lower portion 22 of ring airfoil 21.

Figure 9:
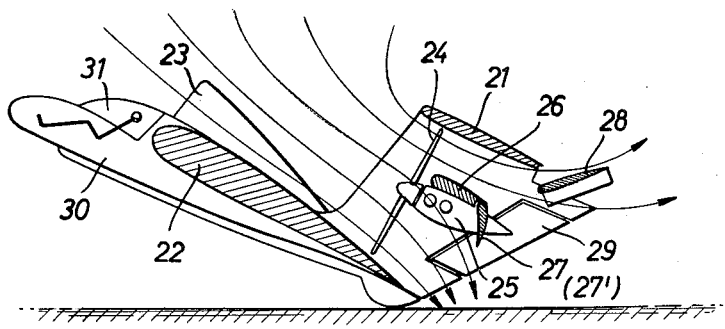
FIGURE 9 shows a lateral, schematical and partly sectional view of the airplane embodiment illustrated in FIGURE 8, in the same state of flight as illustrated in FIGURE 7.

The mold-shaped bottom portion 22 being at the same time the central connecting portion between planar wings 23 and 23a, has an upper surface of such airfoil shape that the air flow characterized by corresponding flow lines in FIGURE 9 produces a buoyancy at this wing portion 22 in particular during the positioning of flaps 27, 27' and elevator 28 required for very slow or floating flight. The airplane then assumes the position illustrated in FIGURE 9.

The aileron flaps 27 and 27' are adjustable by displacement in the same or in opposite sense. When both are turned downwardly as in FIGURE 10, they deflect the air current in the same manner as in the example of operation illustrated in FIGURE 7.

The lines of air flow shown in FIGURE 9 reveal that during floating all control elements of the airplane face the air current with their full available control surface area, so that the airplane remains completely under control even during this type of flight.

Figure 10:
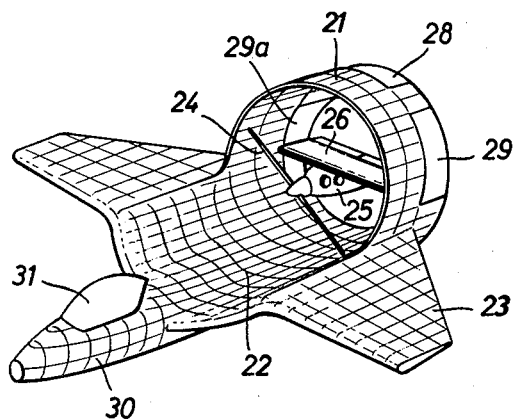
FIGURE 10 shows an embodiment similar to that shown in FIGURE 8 but with a different ratio of planar wing to ring airfoil surface.

The embodiment of the invention illustrated in FIGURE 10 is similar to that shown in FIGURE 8. However, in this embodiment the surface area of the planar wings 23 is smaller in relation to the supporting surface of ring airfoil 21 than is the case in the embodiment shown in FIGURE 8.

Figure 11:
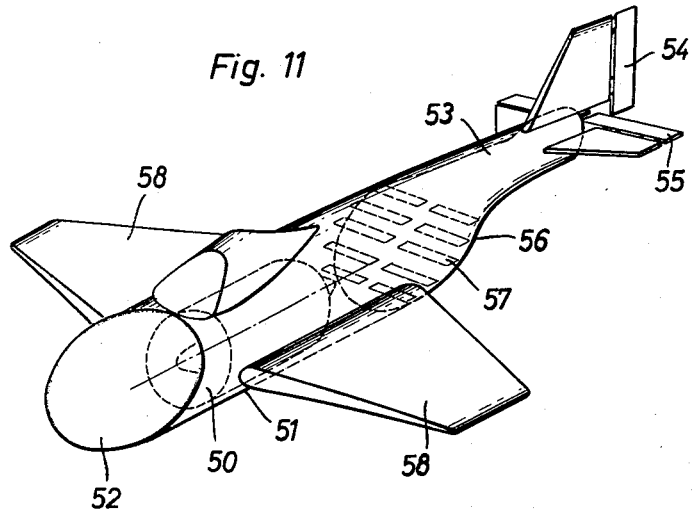
FIGURE 11 illustrates in a schematical perspective view an airplane provided with a combination of conventional "planar" wings and a ring airfoil or annular tunnel wing according to the invention, which airplane is equipped with jet turbine propulsion means.

This airplane shown in FIGURE 11 will glide to earth, in the case of engine failure, with a higher speed than the airplane shown in FIGURE 8, for the landing speed of the gliding plane is dependent on the particular layout chosen in dimensioning the flying machine. Stability during the various types of flight such as rapid flight, slow flight, floating and gliding, is also influenced by the ratio of planar wing surface to ring airfoil surface.

These various considerations will determine the ultimate choice of design and dimensions made by the aircraft builder, such as the shape of the planar wings if such are used, and the angle which the limiting planes through the front and trailing edges of the ring airfoil form with the plane containing the longitudinal central axis of the latter, the degree up to which the lower portion of the ring airfoil is advanced or the upper portion displaced toward the rear, etc.

Figure 12:
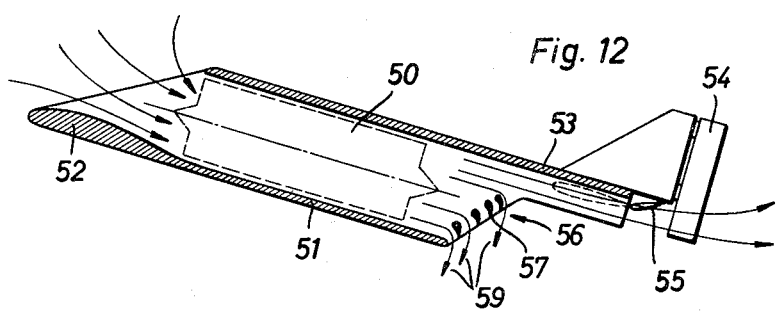
FIGURE 12 is a schematical cross-sectional view of the airplane shown in FIGURE 11.
Figure 13:
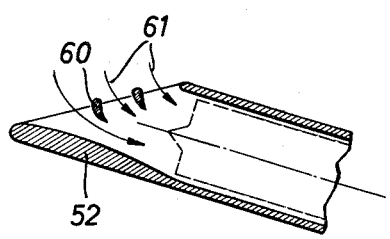
FIGURE 13 is a schematical cross-sectional view of the front portion of a turbine jet aircraft embodiment similar to that shown in FIGURES 11 and 12.

While the preceding embodiments show propeller-driven aircraft, the embodiments shown in FIGURES 11 to 13 show jet-propelled aircraft.

Thus, the airplane schematically illustrated in FIGURE 11 is equipped with jet propulsion engine 50. The latter is built preferably short in accordance with the purpose of the present invention.

Engine 50 is housed in a tubular fuselage 51, the lower portion of which is advanced in forward direction at 52, while its upper portion is prolonged toward the rear of the airplane as indicated at 53. The general concept of my invention is thus embodied in this plane, the entire fuselage serving, in a manner of speaking, as the ring airfoil.

The tail end of the stern part 53 of the airplane bears the rudder 54 and elevator 55 which are thus at least with a part of them arranged within the reach of the gas jet from engine 50.

The oblique rear end plane 56 of that part of the fuselage which corresponds to the ring airfoil in the preceding embodiment, is provided with an aileron assembly 57, the individual flaps of which are shown in downturned position in FIGURE 12.

Again, as in the preceding example, the aileron flaps 57 may be adjusted, by conventional steering means not shown in the drawings, to be raised or lowered either in union for deflecting the gas jet downwardly as illustrated in FIGURE 12, or the group of ailerons on the one side upwardly and on the other side downwardly, i.e. in opposite direction to each other to tilt the airplane by a desired angle about its longitudinal axis.

These aileron flaps are so arranged that, when all flaps are lowered, as in FIGURE 12 illustrated, the momenta acting on the airplane about the transversal axis of the latter are at equilibrium.

During rapid flight, buoyancy is obtained by the provision of planar wings 58, of the conventional airfoil cross section. Also, the shutter-type arranged aileron flaps 57 are so adjusted during rapid flight that they oppose minimum resistance to the gas jet. The elevator 55 is in normal position as shown in FIGURE 11.

During floating flight, the elevator 55 is raised as indicated in FIGURE 12, and the set of aileron flaps so depressed that the gas jet is deflected to a general downward direction, as indicated by arrow tips 59 in FIGURE 12.

In FIGURE 12 the tubular fairing of the propulsion means (engine 50) and the airfoil cross section of the nose of the plane in the zone of the lower portion 52 are only indicated schematically.

Due to this airfoil shape of the bottom portion 52, the influx of air creates a lifting component similar to force P20 shown in FIGURE 7. This nose portion of the airplane shown in FIGURE 12 may also be modified in various other ways, as illustrated in the other figures of the drawings.

The forward or nose portion shown in FIGURE 13 of a jet-propelled airplane similar to the embodiment shown in FIGURES 11 and 12, is equipped with deflecting means 60 in the form of airfoil cross-sectional flaps, which, when positioned as in FIGURE 13, increase the lift exerted on the nose portion of the airplane at 52.

During normal travelling or rapid flight, the forward deflecting means 60 as well as the ailerons 57 are so adjusted as to offer the least possible resistance to the flow of air through the tubular fuselage 50. The ailerons 57 are then only used for trimming the flying machine.

During floating flight both control means 57 and 60 are so adjusted that air is suctioned downwardly into the tubular fuselage 50, as indicated by arrows 61 in FIGURE 13, and deflected at end face 57 of the airplane fuselage, thereby imparting lifting components to these parts of the airplane.

The embodiment of a jet-propelled airplane illustrated in FIGURES 11 to 13 permit to convert the propelling power of the turbine engine substantially completely to lifting power, without unduly changing the normal flight position of the airplane relative to the horizontal plane.

It is also possible to build airplanes on the basis of the same general concept of my invention, which possess several ring airfoils housing turbine or propeller actuated propulsion means.

It will be understood that this invention is susceptible to modification in order to adapt it to different usages and conditions, and, accordingly, it is desired to comprehend such modifications within the scope of the appended claims.

What I claim is:

1. An airplane of the type described, comprising a ring airfoil having a bottom portion, an upper portion and lateral wall portions merging with each other in such a manner as to form a substantially cylindrical, substantially horizontally extending central zone, said ring airfoil having in its bottom portion and its upper portion asymmetrical profiles, whereas its lateral portions have symmetrical profiles, and said ring airfoil further having substantially the same profile thickness over the entire circumference, propulsion means being arranged in said ring airfoil, rudder means and elevator means positioned in a portion of the air stream accelerated by said propulsion means, said rudder means and elevator means being located substantially at the downstream end of the ring airfoil and located at a considerable distance from the center of gravity of the airplane, and deflecting means pivotally mounted in another portion of the airstream accelerated by said propulsion means, said deflecting means being adjustable to deflect the air stream downwardly.

2. An airplane of the type described, comprising a ring airfoil having a bottom portion, an upper portion and lateral wall portions merging with each other in such a manner as to form a substantially cylindrical, substantially horizontally extending central zone, said ring airfoil forming substantially the wing assembly of said airplane, said wing assembly having such a large surface that the airplane can make an emergency landing by gliding, propulsion means for the acceleration of an air stream, said propulsion means being arranged in said ring airfoil, rudder means and elevator means positioned in a portion of the airstream accelerated by said propulsion means, deflecting means pivotally mounted in another portion of the airstream accelerated by said propulsion means, said deflecting means being adjustable to deflect the airstream downwardly, and a cabin connected with said ring airfoil.

3. An airplane as described in claim 2, wherein the bottom portion of said ring airfoil protrudes from said zone forwardly and said upper portion of said ring airfoil protrudes from said zone rearwardly.

4. An airplane as described in claim 2, wherein said cabin is directly attached to said ring airfoil.

5. An airplane as described in claim 2, wherein said cabin is provided in the axis of the ring airfoil and further comprising struts, said struts rigidly supporting said cabin on the bottom portion of said ring airfoil.

6. An airplane as described in claim 2, wherein said rudder means and elevator means are positioned at a distance behind the ring airfoil and are connected with said ring airfoil by tail supporting means.

7. An airplane as described in claim 2, wherein said propulsion means are propeller means.

8. An airplane as described in claim 7, wherein said propeller means are arranged at the rear end of the lower portion of the ring airfoil.

9. An airplane as described in claim 2, wherein the propulsion means is a jet propulsion engine.

10. An airplane as described in claim 2, wherein said deflecting means have a stationary front portion and a deflectable rear portion pivotally connected to the front portion.

11. An airplane as claimed in claim 2, wherein at least part of said deflecting means serves as ailerons and is differentially controllable in a conventional manner.

References Cited in the file of this patent

UNITED STATES PATENTS

| | | |
|---|---|---|
| 1,693,159 | Rickelmann | Nov. 27, 1928 |
| 2,879,957 | Lippisch | Mar. 31, 1959 |

FOREIGN PATENTS

| | | |
|---|---|---|
| 20,530 | Great Britain | of 1909 |
| 1,155,513 | France | Dec. 2, 1957 |